United States Patent
Allen

(10) Patent No.: US 9,407,080 B2
(45) Date of Patent: Aug. 2, 2016

(54) HANGER ASSEMBLIES AND CABLING MANAGEMENT SYSTEMS AND METHODS INCLUDING THE SAME

(75) Inventor: Barry Wayne Allen, Siler City, NC (US)

(73) Assignee: COMMSCOPE TECHNOLOGIES LLC, Hickory, NC (US)

(*) Notice: Subject to any disclaimer, the term of this patent is extended or adjusted under 35 U.S.C. 154(b) by 110 days.

(21) Appl. No.: 13/344,949

(22) Filed: Jan. 6, 2012

(65) Prior Publication Data
US 2012/0175482 A1    Jul. 12, 2012

Related U.S. Application Data

(60) Provisional application No. 61/430,652, filed on Jan. 7, 2011.

(51) Int. Cl.
*A47H 1/10* (2006.01)
*H02G 7/06* (2006.01)
(Continued)

(52) U.S. Cl.
CPC .............. *H02G 7/06* (2013.01); *H02G 15/043* (2013.01); *H02G 15/18* (2013.01); *H01B 9/008* (2013.01); *H01B 11/007* (2013.01); *H02G 7/00* (2013.01); *H02G 7/053* (2013.01)

(58) Field of Classification Search
CPC ......... H02G 7/053; H02G 7/00; H01B 9/008; H01B 11/007; B60M 1/23; B60M 1/20; B60M 1/24; B60M 1/225; B60M 1/26
USPC ......... 248/317, 323, 324, 327, 341, 343, 320; 385/95, 96, 97, 98, 99, 134, 135; 104/89; 191/41, 44; 174/40 CC, 40 R, 174/41–44, 45 R, 45 TD, 61, 74 R, 77 R, 174/75 D, 80, 88 R, 91, 92, 93
See application file for complete search history.

(56) References Cited

U.S. PATENT DOCUMENTS 1,448,141 A * 3/1923 Manz et al. ................. 191/41
2,252,820 A   8/1941 Tallman
(Continued)

FOREIGN PATENT DOCUMENTS

| DE | 38 03 335 A1 | 8/1989 | |
| DE | 3803335 A1 * | 8/1989 | ............... H02G 7/06 |
| EP | 2 128 505 A2 | 12/2009 | |

OTHER PUBLICATIONS

"Cable Lashing Clamp," TVO Communications, Retrieved Date: Dec. 17, 2010, From URL: http://www.tvcinc.com/hardware/cable-lashing-clamp/ (1 page).

(Continued)

*Primary Examiner* — Syed A Islam
*Assistant Examiner* — Taylor Morris
(74) *Attorney, Agent, or Firm* — Merchant & Gould P.C.

(57) ABSTRACT

A hanger assembly for mounting an enclosure on an elongate support includes a body, first and second arms, and first and second attachment devices. The body is configured to be secured to the enclosure. The first and second arms each have opposed upper and lower ends. The lower ends are each pivotally secured to the body. The first and second attachment devices are located on the upper ends of the first and second arms, respectively, and are configured to secure the first and second arms, respectively, to the elongate support. The first and second arms can be pivoted about their lower ends to selectively adjust a spacing between the body and the elongate support to thereby selectively adjust a distance between the enclosure and the elongate support.

26 Claims, 15 Drawing Sheets

(51) Int. Cl.
*H02G 15/04* (2006.01)
*H02G 15/18* (2006.01)
*B42F 13/00* (2006.01)
*H02G 7/05* (2006.01)
*H02G 7/12* (2006.01)
*H02G 7/20* (2006.01)
*H02B 1/30* (2006.01)
*H02G 13/00* (2006.01)
*G02B 6/255* (2006.01)
*B60M 1/22* (2006.01)
*H01B 9/00* (2006.01)
*H02G 7/00* (2006.01)
*H01B 11/00* (2006.01)

(56) References Cited

U.S. PATENT DOCUMENTS

| | | | | |
|---|---|---|---|---|
| 2,524,916 | A * | 10/1950 | Loos | 269/97 |
| 4,570,884 | A * | 2/1986 | Armbruster | 248/68.1 |
| 4,721,830 | A * | 1/1988 | Dagan et al. | 174/41 |
| 4,994,630 | A * | 2/1991 | Schilling | 174/41 |
| 5,133,039 | A * | 7/1992 | Dixit | 385/135 |
| 5,886,300 | A | 3/1999 | Strickler | |
| 7,048,490 | B2 * | 5/2006 | Henderson | 414/462 |
| 7,566,170 | B2 * | 7/2009 | Halsmer et al. | 378/189 |

OTHER PUBLICATIONS

"Fiber Optic Splice Closures Mounting Hardware," Tyco Electronics, F616.11/07 (1 page).
"FOSC 400 Ordering Guide for Closures and Accessories," 32 pages (Admitted prior art).
"FOSC 450 Gel-Sealed Fiber Optic Splice Closure Ordering Guide," Tyco Electronics Corporation, © 2004-2009 F429.11/09 (3 pages).
*Exhibit A*—FOSC 400B Closure with Pole Mount Kit (Admitted prior art).
*Exhibit B*— FOSC 400B Closure with Strand Mount Kit (Admitted prior art).
Notification of Transmittal of the International Search Report and the Written Opinion of the International Searching Authority, or the Declaration in corresponding PCT Application No. PCT/US2012/020431 mailed Apr. 16, 2013 (12 pages).
Notification Concerning Transmittal of International Preliminary Report on Patentability in corresponding PCT Application No. PCT/US2012/020431 mailed Jul. 18, 2013 (10 pages).
"Air FOSC, Aerial Fiber Optic Splice Closure," Tyco Electronics, 2005, 2 pp.
Air FOSC B, Aerial In-Line Re-Enterable Fiber Optic Splice Closure, Tyco Electronics, 1999, 8 pp.

* cited by examiner

HANGER ASSEMBLIES AND CABLING MANAGEMENT SYSTEMS AND METHODS INCLUDING THE SAME

RELATED APPLICATION(S)

This application claims the benefit of and priority from U.S. Provisional Patent Application No. 61/430,652 filed Jan. 7, 2011, the disclosure of which is incorporated herein by reference.

FIELD OF THE INVENTION

The present invention relates to supports for cable enclosures.

BACKGROUND OF THE INVENTION

It is often necessary or desirable to provide splices in aerial telecommunication and CATV cables and splice enclosures mounted adjacent the cables to protect the splices. Typically, one or a bundle of aerial telecommunication cables are lashed to a messenger strand or cable that spans and is anchored to spaced apart supports such as telephone or utility poles. While devices and systems are known for hanging or securing a splice enclosure to a messenger strand, such devices and systems tend to have multiple components that must be attached and aligned independently, and which may also present many loose parts that can be lost when in the air installing the device.

SUMMARY OF THE INVENTION

According to embodiments of the present invention, a hanger assembly for mounting an enclosure on an elongate support includes a body, first and second arms, and first and second attachment devices. The body is configured to be secured to the enclosure. The first and second arms each have opposed upper and lower ends. The lower ends are each pivotally secured to the body. The first and second attachment devices are located on the upper ends of the first and second arms, respectively, and are configured to secure the first and second arms, respectively, to the elongate support. The first and second arms can be pivoted about their lower ends to selectively adjust a spacing between the body and the elongate support to thereby selectively adjust a distance between the enclosure and the elongate support.

According to embodiments of the present invention, a mounted enclosure assembly includes an elongate support, an enclosure, and a hanger assembly. The hanger assembly includes a body, first and second arms, and first and second attachment devices. The body is secured to the enclosure. The first and second arms each have opposed upper and lower ends. The lower ends are each pivotally secured to the body. The first and second attachment devices are located on the upper ends of the first and second arms, respectively, and secure the first and second arms, respectively, to the elongate support. The first and second arms can be pivoted about their lower ends to selectively adjust a spacing between the body and the elongate support to thereby selectively adjust a distance between the enclosure and the elongate support.

According to method embodiments of the present invention, a method for mounting an enclosure on an elongate support includes: providing a hanger assembly having first and second arms each having opposed upper and lower ends; securing the lower ends of the first and second arms to the enclosure; securing the upper ends of the first and second arms to the elongate support; and moving the first and second arms to adjust a spacing between the enclosure and the elongate support.

According to embodiments of the present invention, a unitary hanger/enclosure assembly for mounting on an elongate support. The hanger/enclosure assembly includes an enclosure, first and second arms, and first and second attachment devices. The enclosure includes at least one integral anchor portion. The first and second arms each have opposed upper and lower ends, the lower ends each being pivotally secured to the at least one integral anchor portion. The first and second attachment devices are located on the upper ends of the first and second arms, respectively, and are configured to secure the first and second arms, respectively, to the elongate support. The first and second arms can be pivoted about their lower ends to selectively adjust a distance between the enclosure and the elongate support.

Further features, advantages and details of the present invention will be appreciated by those of ordinary skill in the art from a reading of the figures and the detailed description of the preferred embodiments that follow, such description being merely illustrative of the present invention.

DESCRIPTION OF EMBODIMENTS OF THE PRESENT INVENTION

Figure 1:
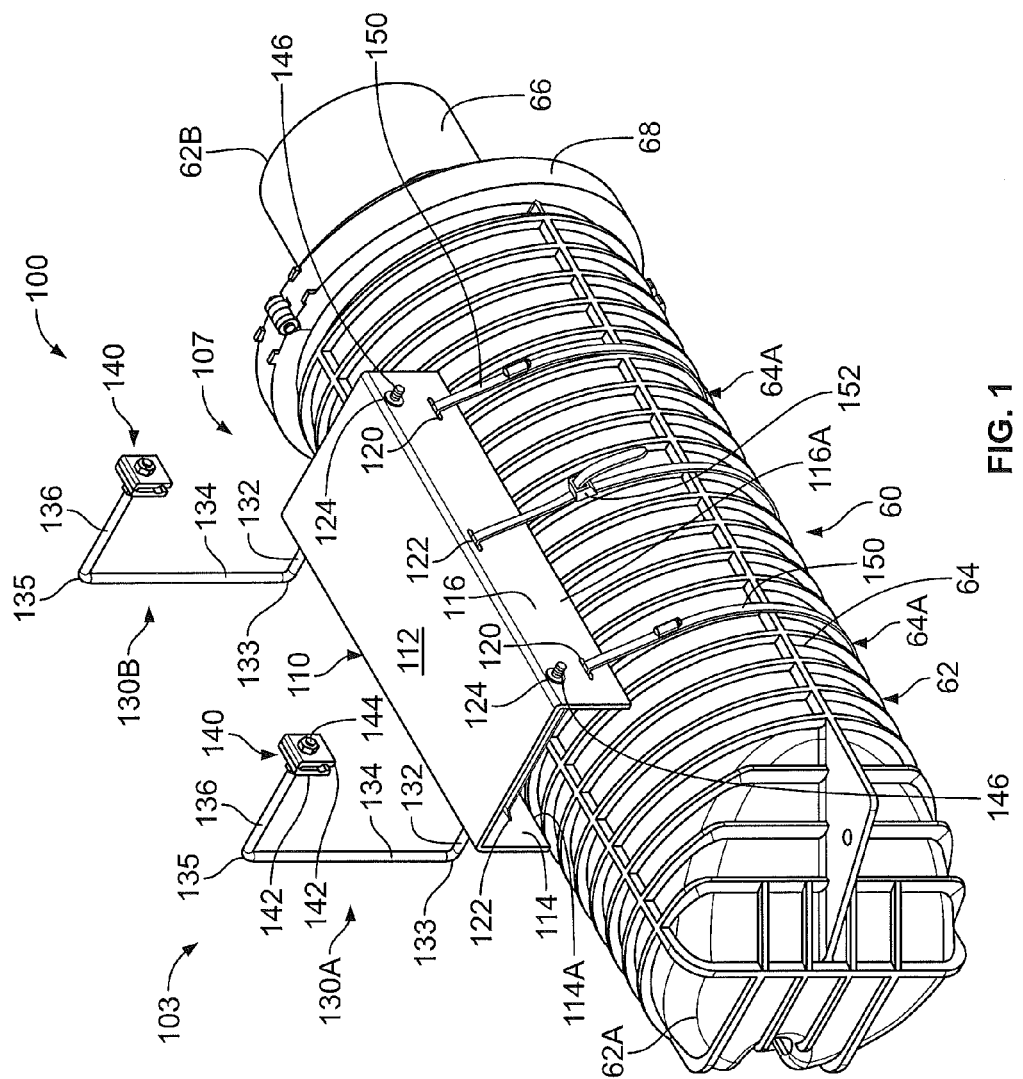
FIG. 1 is a top perspective view of a unitary hanger/enclosure assembly including an enclosure and a hanger assembly according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

As used herein, "trapezoid" means a quadrilateral having exactly one pair of opposite sides (i.e., bases) parallel, the other pair of opposite sides (i.e., legs) being non-parallel. "Isosceles trapezoid" refers to a trapezoid wherein the non-parallel opposite sides are equal in length and both of the angles coming from a given one of the bases are equal. "Altitude" refers to the perpendicular distance from one base to another.

As used herein, "monolithic" means an object that is a single, unitary piece formed or composed of a material without joints or seams.

According to embodiments of the present invention, a hanger assembly is provided that can solve the need for a more simple, user-friendly strand mounted enclosure hanger that can support aerial enclosures (e.g., telecommunication splice enclosures) in close proximity to one or more transmission cables (e.g., fiber optic and/or copper wire telecommunication or CATV cables) attached to the strand. Embodiments of the invention use multiple articulating or movable (e.g., pivoting) hanger arms to selectively adjust the vertical distance between the strand and the enclosure while keeping the enclosure substantially parallel to the strand. Some embodiments of the invention use a trapezoidal configuration to obtain stability and keep the enclosure substantially parallel with the strand. Some embodiments of the invention use a parallelogram configuration. Embodiments of the invention may also incorporate a crossbrace to obtain one or more discrete fixed vertical spacings between the enclosure and the strand. A given hanger assembly of the present invention may be effectively used to mount enclosures of various types and sizes. The hanger assembly may be adjustable without loose parts and/or can be pre-assembled in the factory. The hanger assembly may enable an installer to simultaneously align bracket attachments to the strand rather than requiring multiple independent attachments.

With reference to FIGS. 1-9, a hanger assembly or bracket 100 according to embodiments of the present invention is shown therein. The hanger assembly 100 can be mounted on an apparatus such as a splice enclosure 60 to secure the enclosure 60 to an elongate support substrate, such as a messenger cable or strand 30, to thereby form a mounted enclosure assembly 105 (FIGS. 2-5).

Figure 2:
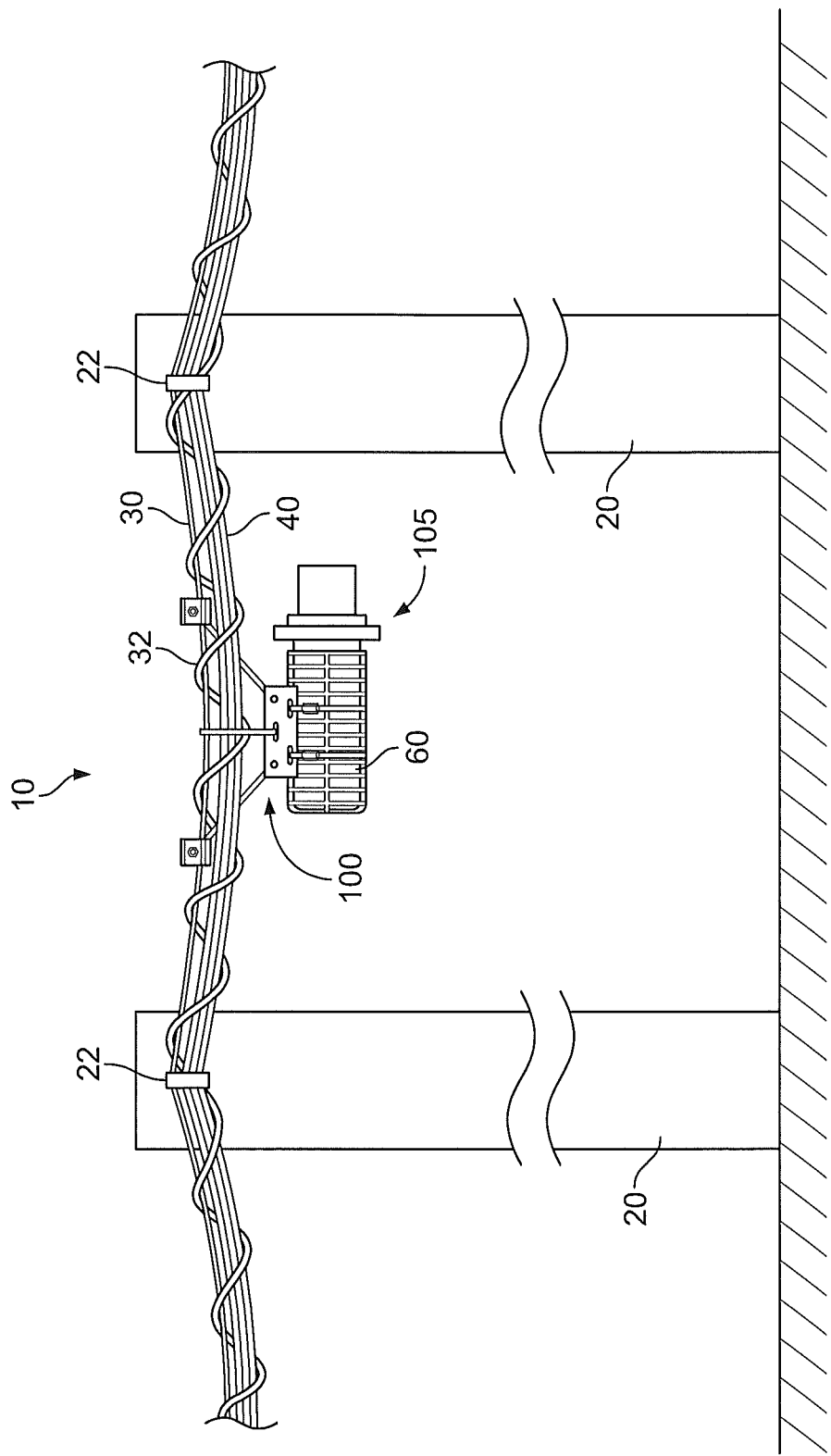
FIG. 2 is a schematic view of a telecommunications cabling management system according to embodiments of the present invention including the unitary hanger/enclosure assembly of FIG. 1.

With reference to FIG. 2, in some embodiments, the hanger assembly 100 forms a part of a telecommunications cabling management system 10. In the system 10, a messenger cable or strand 30 is suspended, under tension, from a plurality of utility poles 20 (or other suitable support structures) by anchors 22 or the like such that the strand 30 spans the poles 20. One or a bundle 40 of cables 42 are secured to the strand 30 by a lashing wire 32, which may be helically wound about the bundle 40 along the lengths of the strand 30 and the bundle 40. As discussed in more detail hereinbelow, the enclosure 60 is coupled and suspended from the strand 30 by the hanger assembly 100. One or more sections 42A of the cables 42 (FIG. 8) may extend into and out from the enclosure 60.

The cables 42 may be any suitable type of cable. According to some embodiments, the cables 42 are data transmission cables. According to some embodiments, the cables 42 are fiber optic telecommunication cables. According to some embodiments, the cables 42 are copper telecommunication cables. According to some embodiments, the cables 42 are telephone and/or CATV cables.

The enclosure 60 (FIG. 1) is merely exemplary and may be any suitable type or configuration of enclosure or other device to be secured to a strand. According to some embodiments, the enclosure 60 is a cable splice enclosure adapted to receive portions of cables 42 to contain and environmentally protect splices between the cables 42. The illustrated enclosure 60 includes a housing 62 having first and second opposed ends 62A, 62B. The housing 62 includes a cover 64 and a base 66. The base 66 is secured to the cover 64 by a clamp 68. Circumferential grooves 64A are defined in the outer surface of the cover 64. The enclosure 60 may be formed of a polymeric material, for example. Suitable enclosures 60 may include the FOSC 450D splice enclosure available from TE Connectivity. Other suitable types of enclosures may include flat and in-line splice enclosures.

The strand 30 may be of any suitable construction. The strand 30 may include only one unitary cable strand or filament or may be comprised of a plurality of strands or filaments helically twisted about one another. The strand 30 may be formed of any suitable material, such as steel. According to some embodiments, the strand 30 has an outer diameter in the range of from about 0.25 to 0.5 inch.

Figure 3:
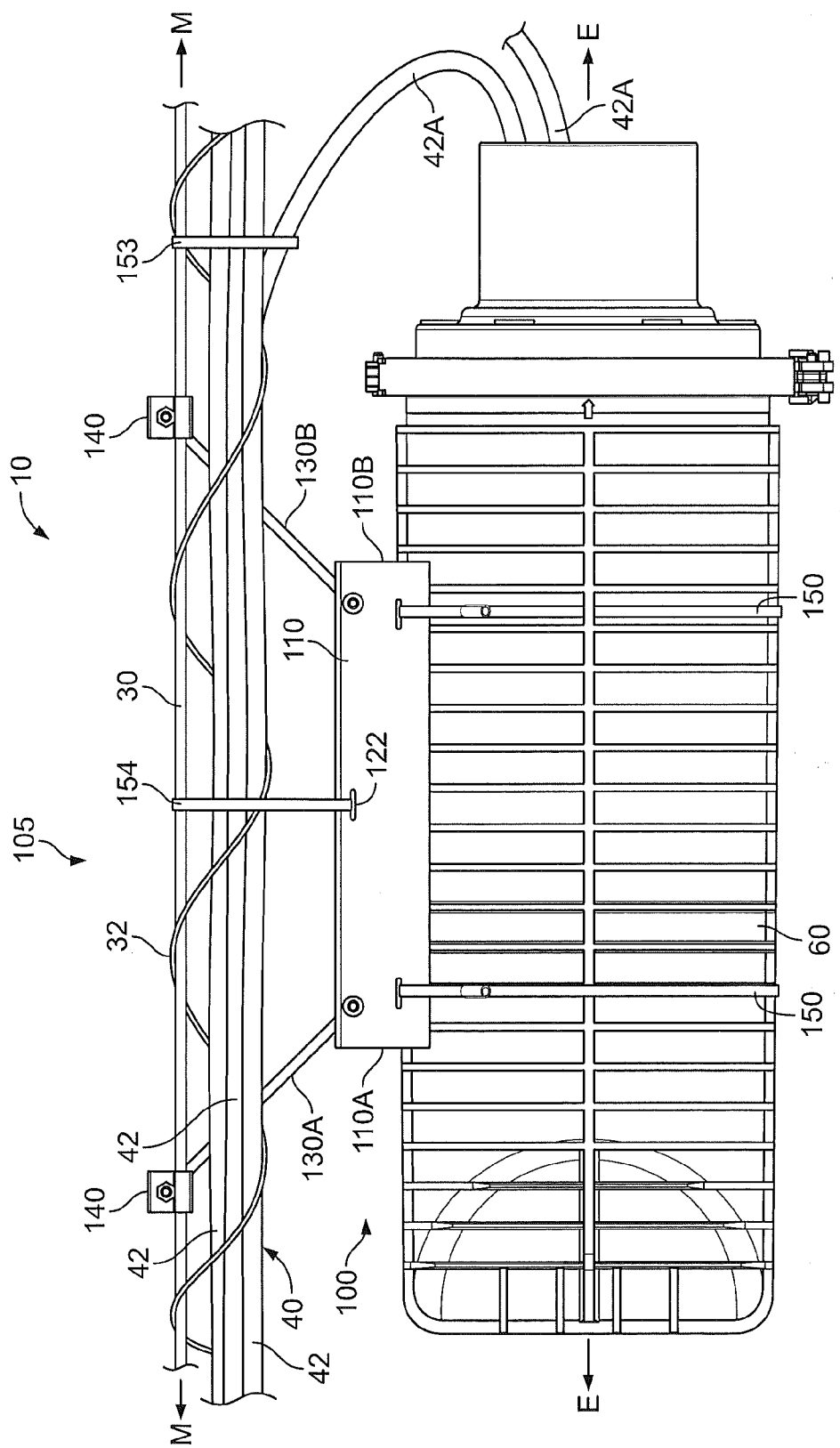
FIG. 3 is a fragmentary, side view of the telecommunications cabling management system of FIG. 2.

The hanger assembly 100 (FIG. 1) includes a bracket, body or base 110, a left arm 130A and a right arm 130B pivotally joined to the body 110, and a pair of enclosure coupling devices 150 to secure the base 110 to the enclosure 60. The hanger assembly 100 may be supplied as a kit along with one or more supplemental fastening devices such as zip ties 152 (FIG. 1) and 153 (FIG. 3).

The base 110 has opposed ends 110A, 110B (FIG. 3), a top wall 112, and opposed first and second side walls 114, 116 (FIG. 1). A pair of coupling slots 120 is defined in each side wall 114, 116. A supplemental slot 122 is also formed in each side wall 114, 116. Pivot holes 124 as defined in each side wall 114, 116 proximate the ends 110A and 110B. The base 110 may be formed of any suitable material and in some embodiments is formed of a metal such as steel.

The arms 130A, 130B may be generally L-shaped or C-shaped. As shown, each arm 130A, 130B (FIG. 1) includes an intermediate or vertical section 134 having a lower end 133 and an upper end 135, a lower section 132 extending laterally from the lower end 133, and an upper section 136 extending laterally from the upper end 135. Each arm 130A, 130B is pivotally mounted in a pair of the pivot holes 124 to pivot or rotate about a respective transverse pivot axis P-P and is retained therein by nuts or lock collars 146. According to some embodiments, the arms 130A, 130B are round in cross-section. A strand attachment device or clamp 140 is mounted on the end of each upper section 136 opposite the section 134. Each clamp 140 (FIG. 1) includes a pair of opposed clamp plates 142 and nuts 144 disposed on either side of the clamp plates 142 and threadedly mounted on the ends of the arms 130A, 130B. Each clamp 140 may be enabled to pivot about the end of its respective associated arm 130A, 130B. The clamps 140 may be commonly referred to as "bug nuts". Other types or configurations of fastening devices may be employed. The arms 130A, 130B may be formed of any suitable material and in some embodiments are formed of a metal such as steel.

The coupling devices 150 may be hose clamps (as illustrated) capable of being selectively contracted by an operator. Other suitable types of fastening or coupling devices may be employed in place of or in addition to the hose clamps 150.

According to embodiments of the present invention, the enclosure 60 may be installed on the strand 30 as follows using the hanger assembly 100. It will be appreciated that certain steps may be reordered or omitted. Typically, the arms 130A, 130B are pre-installed on the base 110 at the factory.

The base 110 is placed on the enclosure cover 64 such that lower edges 114A, 116A of the walls 114, 116 engage the cover 64. The hose clamps 150 are routed through the slots 120 and around the circumference of the cover 64 such that the hose clamps 150 seat in the grooves 64A. The hose clamps 150 are tightened to securely couple the enclosure 60 to the base 110. A unitary hanger/enclosure assembly 103 (FIG. 1) is thereby formed. A zip tie 152 (FIG. 1) can be mounted through the slot 122 and used to temporarily secure the base 110 to the enclosure 60 while the hose clamps 150 are being installed and thereafter removed.

Figure 4:
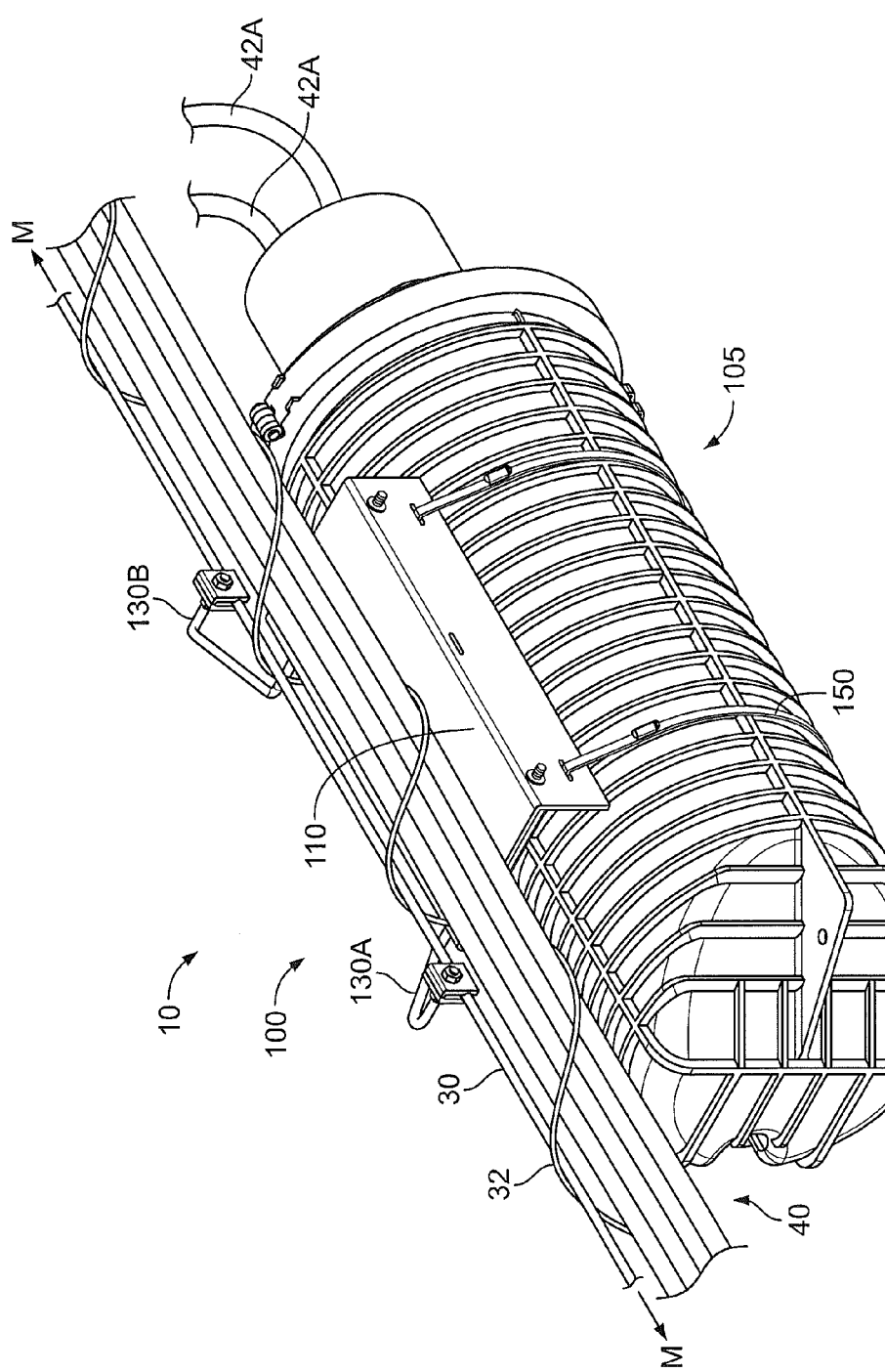
FIG. 4 is a fragmentary, top perspective view of the telecommunications cabling management system of FIG. 2.
Figure 5:
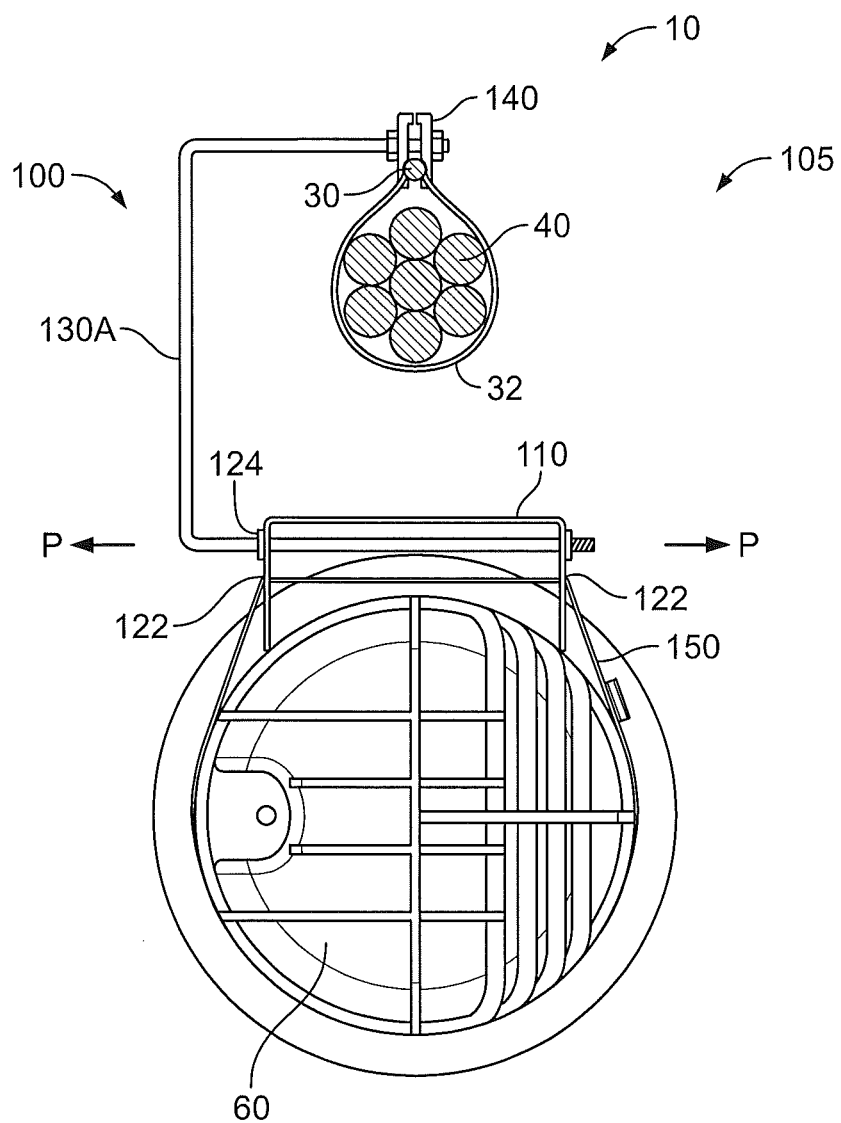
FIG. 5 is a fragmentary, end view of the telecommunications cabling management system of FIG. 2.

The assembly 103 can then be installed on the strand 30 as follows (however, according to other embodiments, the hanger assembly 100 may first be coupled to the strand 30 and thereafter to the enclosure 60). The base 110 is brought into proximity with the strand 30 and each of the arms 130A, 130B is looped over the cable bundle 40 as best seen in FIGS. 3-5. The pivotal couplings between the base 110 and the arms 130A, 130B permit the arms 130A, 130B to rotate into the appropriate orientation. The clamps 140 may be loosely engaged with the strand 30 to permit the clamps 140 to slide along the strand 30 and pivot to maintain alignment with the strand 30. The base 110 is positioned at a selected distance D2 from the lengthwise centerline M-M of the strand to achieve a desired hanging distance between the enclosure 60 and the strand 30. In some embodiments, the base 110 and the arms 130A, 130B are positioned such that the upper ends 135 of the arms 130A, 130B are spaced apart a greater distance from one another than the lower ends 133, and the base 110 and the arms 130A, 130B along with the strand 30 define a trapezoid. In other embodiments, the base 110 and the arms 130A, 130B are positioned to define a parallelogram with the strand 30.

The clamps 140 are then tightened onto the strand 30 to prevent or inhibit the upper ends 135 of the arms 130A, 130B from sliding along the length of the strand 30. The tightening of the clamps 140 may also prevent or inhibit each upper end 135 from pivoting with respect to its clamp 140. A zip tie 153 (FIG. 3) or other suitable clamping or fastening device may be used to lash one or more of the cable sections 42A from the enclosure to the strand 30. A zip tie 154 (FIG. 3) may be mounted through the slot 122 and over the strand 30 to temporarily mount the assembly 103 on the strand 30 during the foregoing procedure.

Figure 6A:
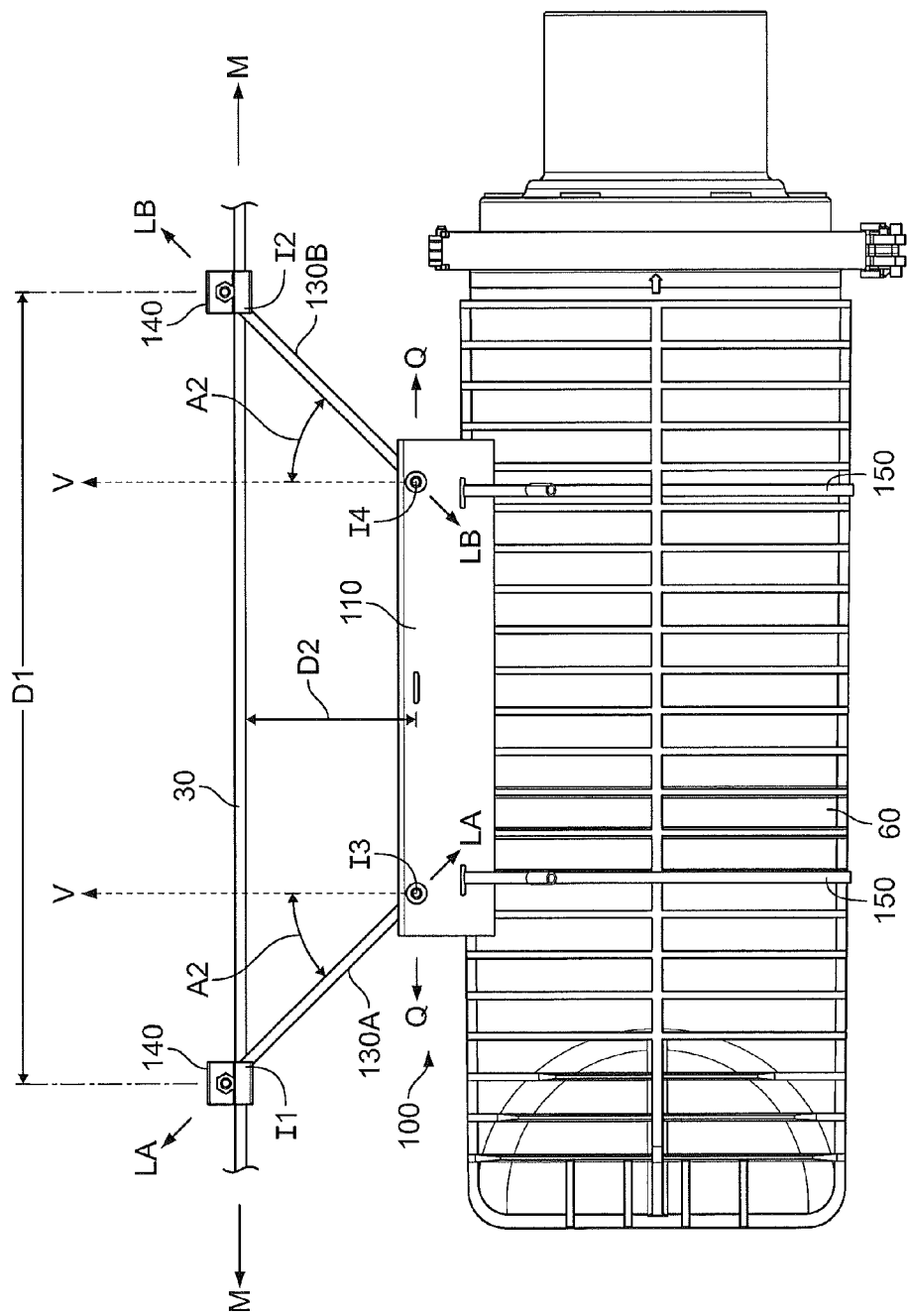
FIG. 6A is a fragmentary, side view of the telecommunications cabling management system of FIG. 2 with a cable bundle and lashing wire thereof omitted for the purpose of explanation.
Figure 6B:
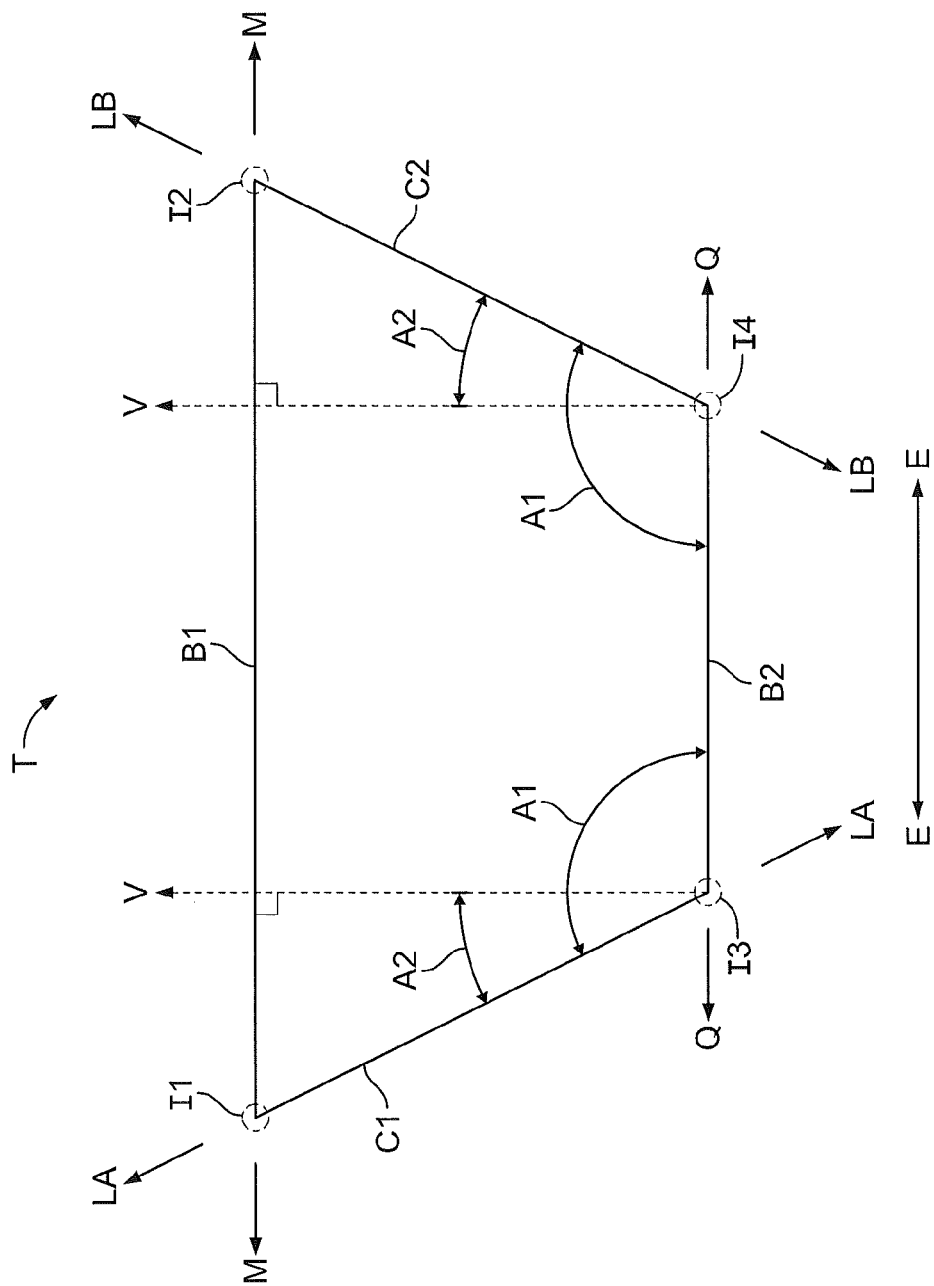
FIG. 6B is a schematic diagram representing the relationships between certain axes and vertices of the telecommunications cabling management system of FIG. 2.

Referring to FIGS. 5, 6A and 6B, the pivot axes P-P (FIG. 5) of the arms 130A, 130B define a pivot point axis Q-Q (FIGS. 6A and 6B). The arm 130A defines a first arm axis LA-LA that intersects the pivot point axis Q-Q at a vertex I3 and intersects the strand centerline axis M-M at a vertex I1. Similarly, the second arm 130B defines a second arm axis LB-LB that intersects the axis Q-Q at a vertex I4 and intersects the axis M-M at a vertex I2.

According to some embodiments and as illustrated in FIG. 6B, the vertices I1-I4 collectively define a trapezoid T having parallel, opposed base lines or bases B1 and B2 and non-parallel, opposed leg lines or legs C1 and C2. According to some embodiments, the trapezoid T is an isosceles trapezoid.

According to some embodiments, the angle A1 between each leg C1, C2 (i.e., the legs 130A, 130B) and the base B2 (i.e., the base 100) is in the range of from about 5 to 175 degrees and, according to some embodiments, from about 90 to 175 degrees. According to some embodiments, the angle A2 between each leg C1, C2 and vertical V is in the range of from about 0 to 85 degrees and, in some embodiments, from about 5 to 85 degrees. According to some embodiments, the included angle between the legs C1, C2 is in the range of from about 0 to 170 degrees and, in some embodiments, from about 5 to 170 degrees.

According to some embodiments, the distance D1 (FIG. 6A) between the leg ends 135 is in the range of from about 10 to 23 inches. According to some embodiments, the altitude or distance D2 (FIG. 6A) between the bases B1 and B2 (i.e., the pivot point axis Q-Q and the strand centerline M-M) is in the range of from about 1 to 6 inches.

According to some embodiments, the lengthwise axis E-E of the enclosure 60 is substantially parallel to the strand centerline M-M when the hanger/enclosure assembly 103 is fully installed on the strand 30.

Figure 7:
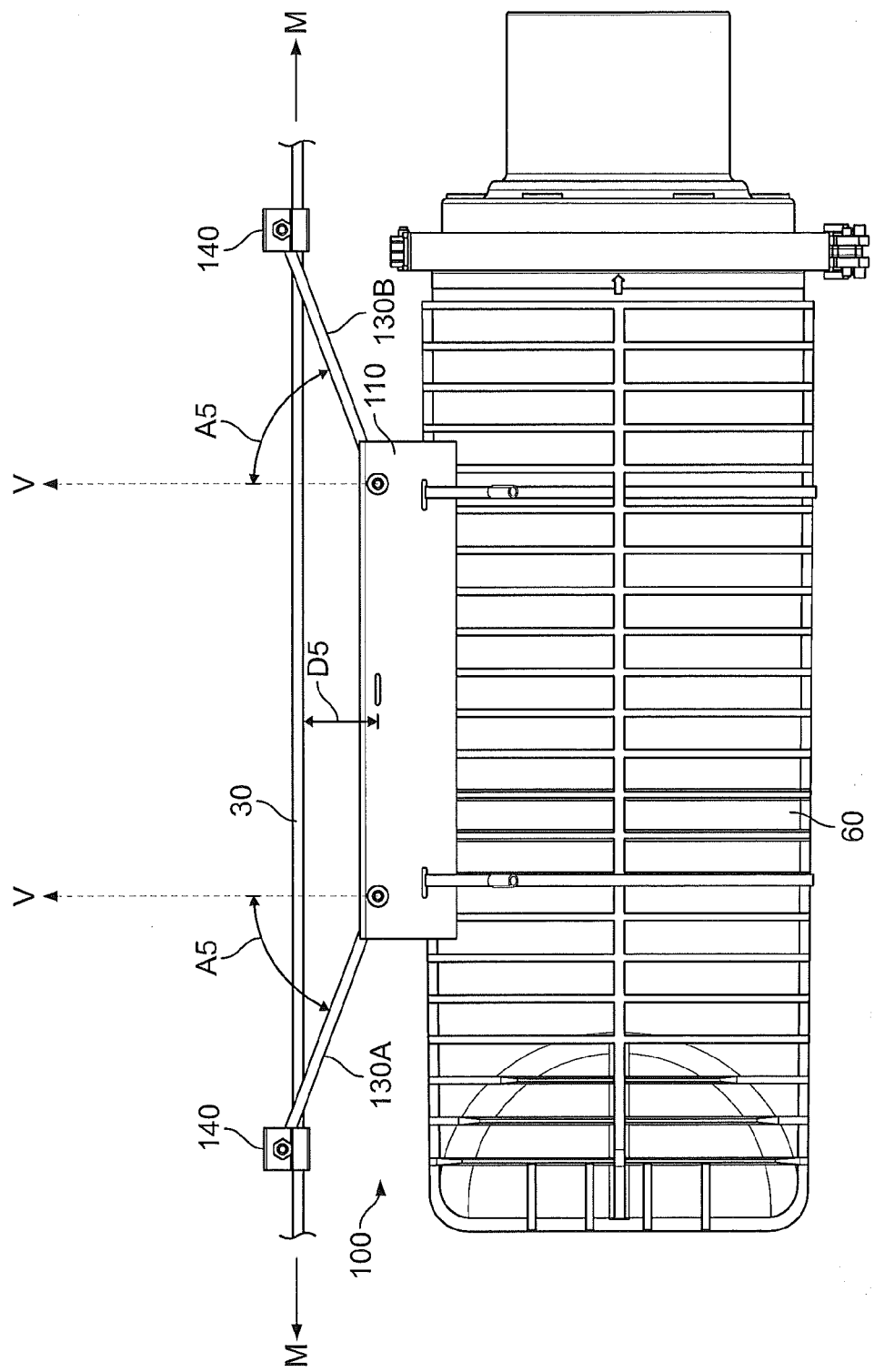
FIG. 7 is a fragmentary, side view of the telecommunications cabling management system of FIG. 2 with a cable bundle and lashing wire thereof omitted for the purpose of explanation, and wherein the unitary hanger/enclosure assembly has been repositioned.
Figure 12:
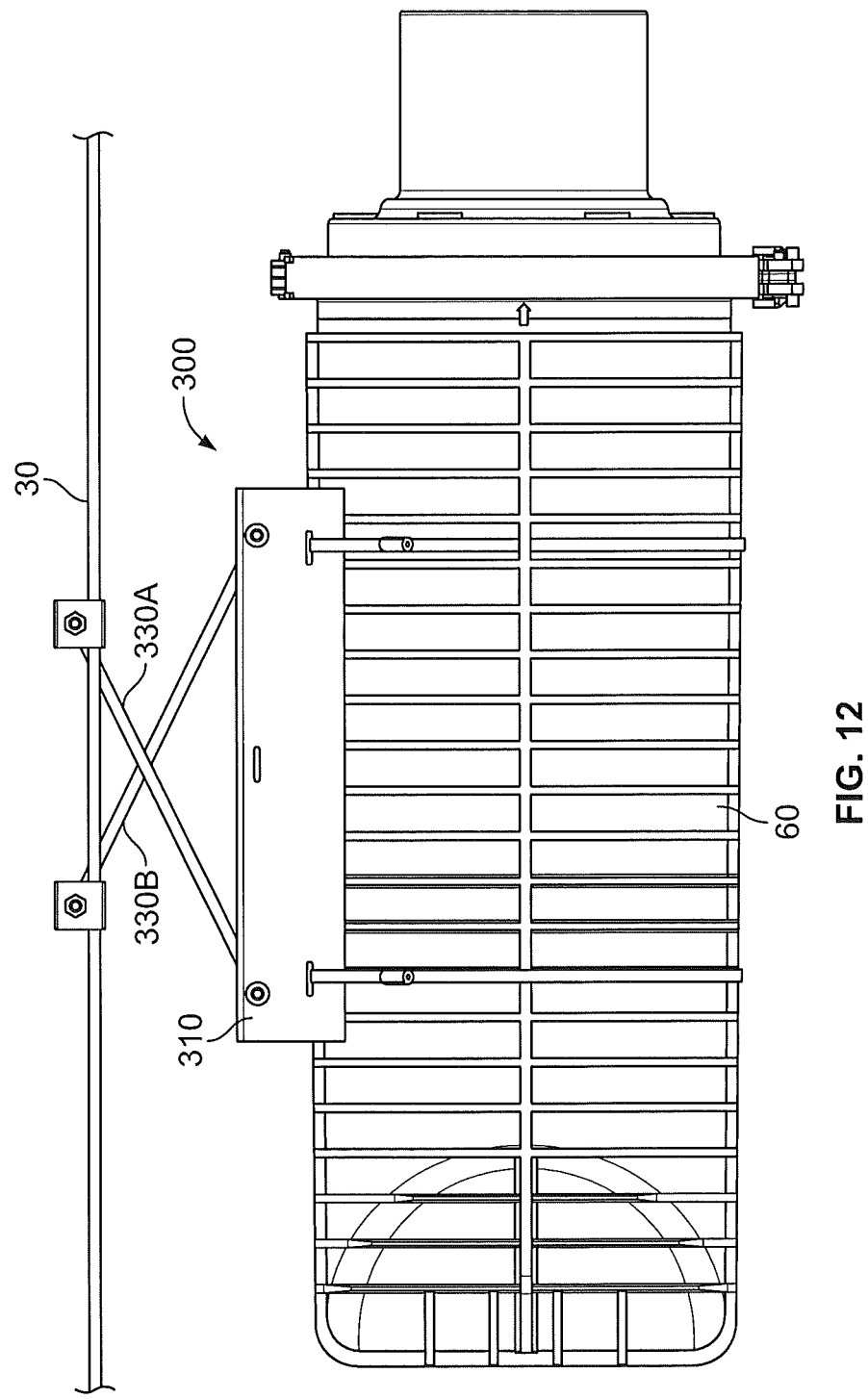
FIG. 12 is a fragmentary, side view of a telecommunications cabling management system according to further embodiments of the present invention with a cable bundle and lashing wire thereof omitted for the purpose of explanation.

With reference to FIG. 7, the angles of inclination of the arms 130A, 130B and the relative spacing distance between the upper ends 135 can be variably selected by the installer to obtain a different desired altitude or distance D5 (FIG. 7), and thereby a different desired distance between the base 110 and the strand 30 and/or other functional properties. For example, as illustrated in FIG. 12, the arms 130A, 130B can each be pivoted to an angle A5 of about 70 degrees with respect to vertical V (as compared to the 45 degree angles A2, as illustrated in FIGS. 6A and 6B).

With reference to FIG. 5, it can be seen that the C-shaped configuration of the arms 130A, 130B and the base 110 can define a cable passage 107 (FIG. 1) between the clamps 140 and the body 110. The passage 107 provides clearance for and accommodates a cable 42 or cable bundle 40 depending from the strand 30.

Figure 8:
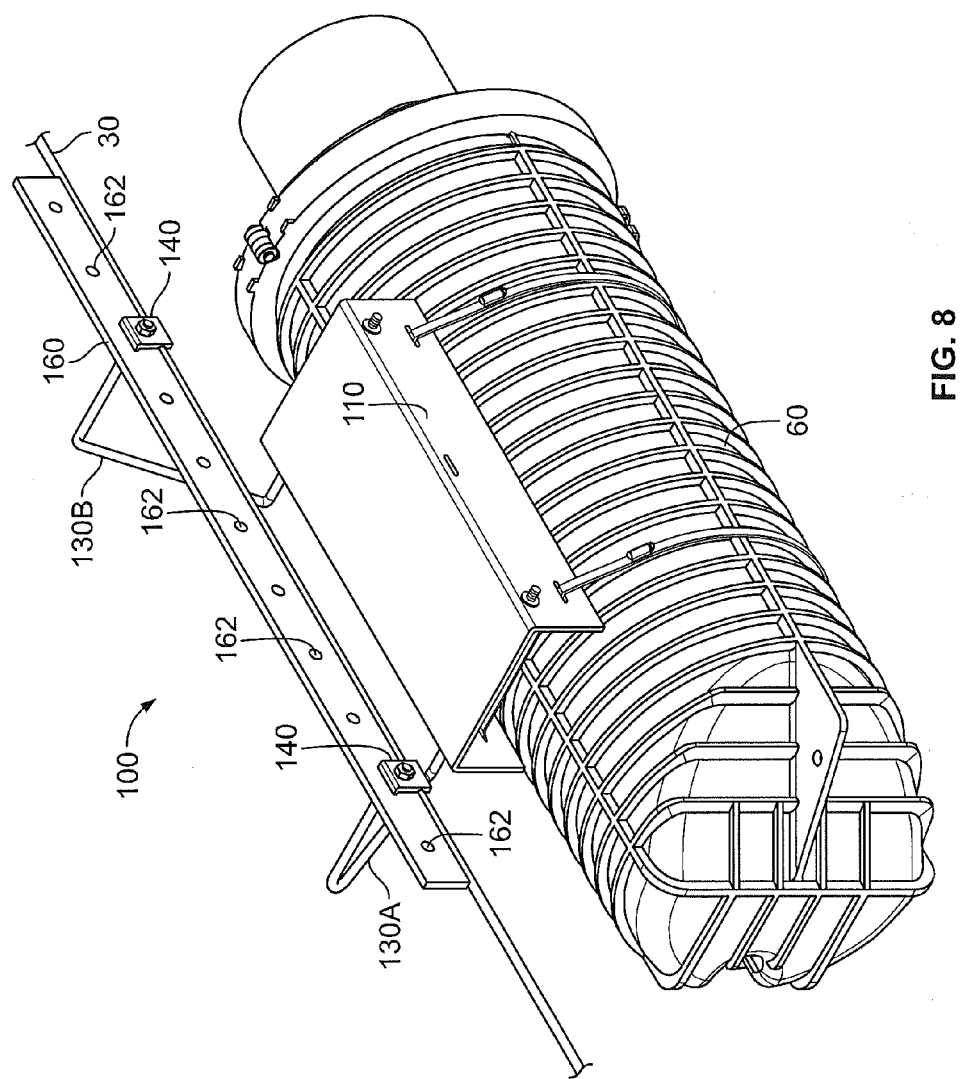
FIG. 8 is a top perspective view of the telecommunications cabling management system of FIG. 2 with a cable bundle and lashing wire thereof omitted for the purpose of explanation, and wherein the hanger assembly is further provided with a crossbrace.

Optionally, the hanger assembly 100 may be further provided (i.e., as part of the kit) with a crossbrace 160 (FIG. 8). The crossbrace 160 is formed of a substantially rigid or semi-rigid material (e.g., metal) and has two or more spaced apart holes 162 therein. In use, the upper sections 136 of the arms 130A, 130B are inserted through respective selected ones of the holes 162 in the crossbrace 160 and secured therein by the clamps 140. The crossbrace 160 can thereby maintain the arms 130A, 130B in a prescribed, discrete configuration, which may correspond to a prescribed distance between the base 110 and the strand 30. Where the crossbrace 160 is provided with multiple pairs of holes 162, the installer may select between multiple prescribed, discrete configurations of the arms. The crossbrace 160 need not serve as a mechanical brace after the hanger assembly 100 has been secured to the strand 30 by the clamps 140.

Hanger assemblies as disclosed herein can provide a number of advantages. The hanging distance or height D5 of the hanger assembly 100 can be easily and securely set to customize the hanger assembly 100 as desired to accommodate the cable bundle 40. The hanger assembly 100 has relatively few separate pieces, but is nonetheless adjustable to accommodate cable bundles of different sizes. The hanger assembly 100 is relatively simple and easy to install in the field.

The hanger assembly 100 can securely mount the enclosure 60 in a manner that provides a stable relationship between the enclosure 60 and the strand 30. If the arms 130A, 130B are arranged to define a parallelogram, movement of the enclosure 60 along the strand 30 can be substantially prevented or limited by lashing the cable sections 42A to the strand 30. If the arms 130A, 130B are arranged to define a trapezoid, movement of the enclosure 60 along, toward and away from the strand 30 may be substantially prevented or limited by the inherent rigidity of the trapezoidal geometric configuration.

Figure 9:
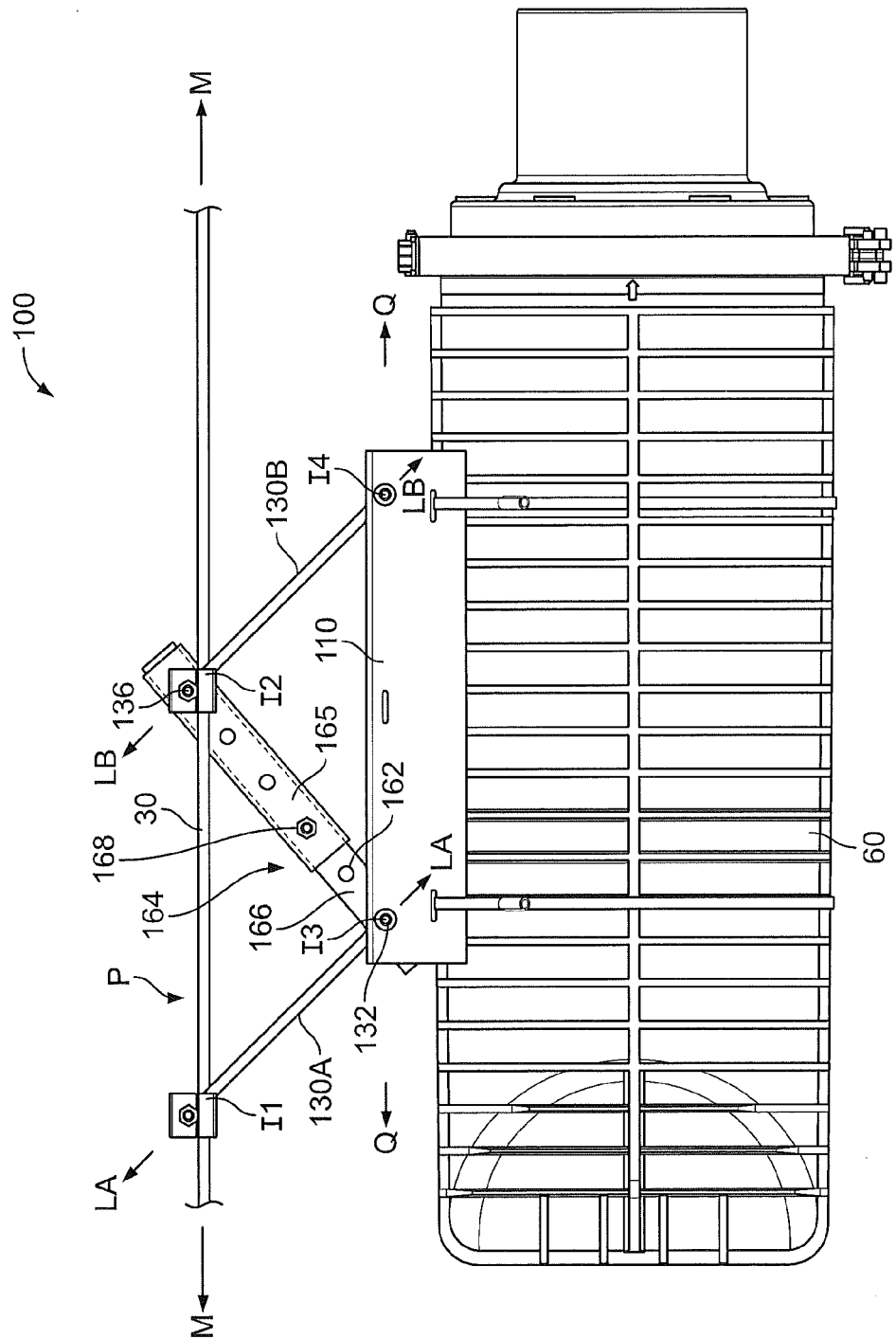
FIG. 9 is a fragmentary, side view of the telecommunications cabling management system of FIG. 8 wherein the hanger assembly is in an alternative, parallelogram configuration.

With reference to FIG. 9, the hanger assembly 100 equipped with an adjustable crossbrace 164 can be mounted on the strand 30 and the enclosure 60 so as to define a parallelogram P defined by the axes LA-LA and LB-LB of the arms 130A and 130B (which serve as a first pair of parallel opposed sides), and the pivot point axis Q-Q and the strand centerline axis M-M (which serve as a second pair of parallel opposed sides). In some embodiments, the parallelogram P is a rectangle. The crossbrace 164 includes two brace members 165, 166 that are axially slidably coupled to provide adjustable overlap between the members 165, 166 to thereby select an overall length of the crossbrace 164 as desired. The members 166 are secured at the selected length by inserting a bolt 168 or the like through overlapping holes 162 of the members 165, 166. The crossbrace 164 is mounted (before or after setting its length) on the arms 130A, 130B such that the lower section 132 of the arm 130A extends through a hole 162 and the upper section 136 of the arm 130B extends through a hole 162. In this way, the crossbrace 164 fixes the distance between the diagonally opposed vertices I3 and I2 or corners of the parallelogram P, thereby preventing or inhibiting the enclosure 60 from moving toward, away from or longitudinally relative to the strand 30. According to some embodiments, a tension load is maintained across the crossbrace 164 when the hanger assembly 100 is deployed. Other configurations may be employed, for example, the crossbrace 164 may instead connect the vertices I1 and I4.

As a further alternative, the hanger assembly 100 may be mounted on the strand 30 such that the arms 130A, 130B define a trapezoid T as described above and the crossbrace 160 may be installed to connect the vertices I1 and I4 or the vertices I3 and I2 as described above.

As a further alternative, the hanger assembly 100 can be mounted on the strand 30 such that the arms 130A, 130B define a parallelogram without provision of a crossbrace (e.g., the crossbrace 160) as shown in FIG. 1, for example. In this case, the longitudinal movement of the enclosure 60 relative to the strand 30 can be prevented or inhibited by the lashing of the cable sections 42A to the strand 30 by zip ties 153 or the like. This arrangement may also permit an installer to swing the enclosure 60 forward or back along the length of the strand 30 when the cable sections 42A are not lashed to the strand 30.

Figure 10:
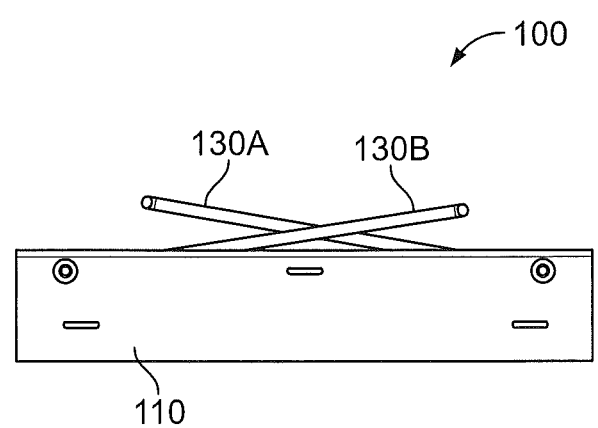
FIG. 10 is a side view of the hanger assembly of FIG. 1 in a flattened configuration.

According to some embodiments, the hanger assembly 100 can be shipped flat or in a reduced form by folding the arms 130A, 130B down as shown in FIG. 10, for example.

Figure 11:
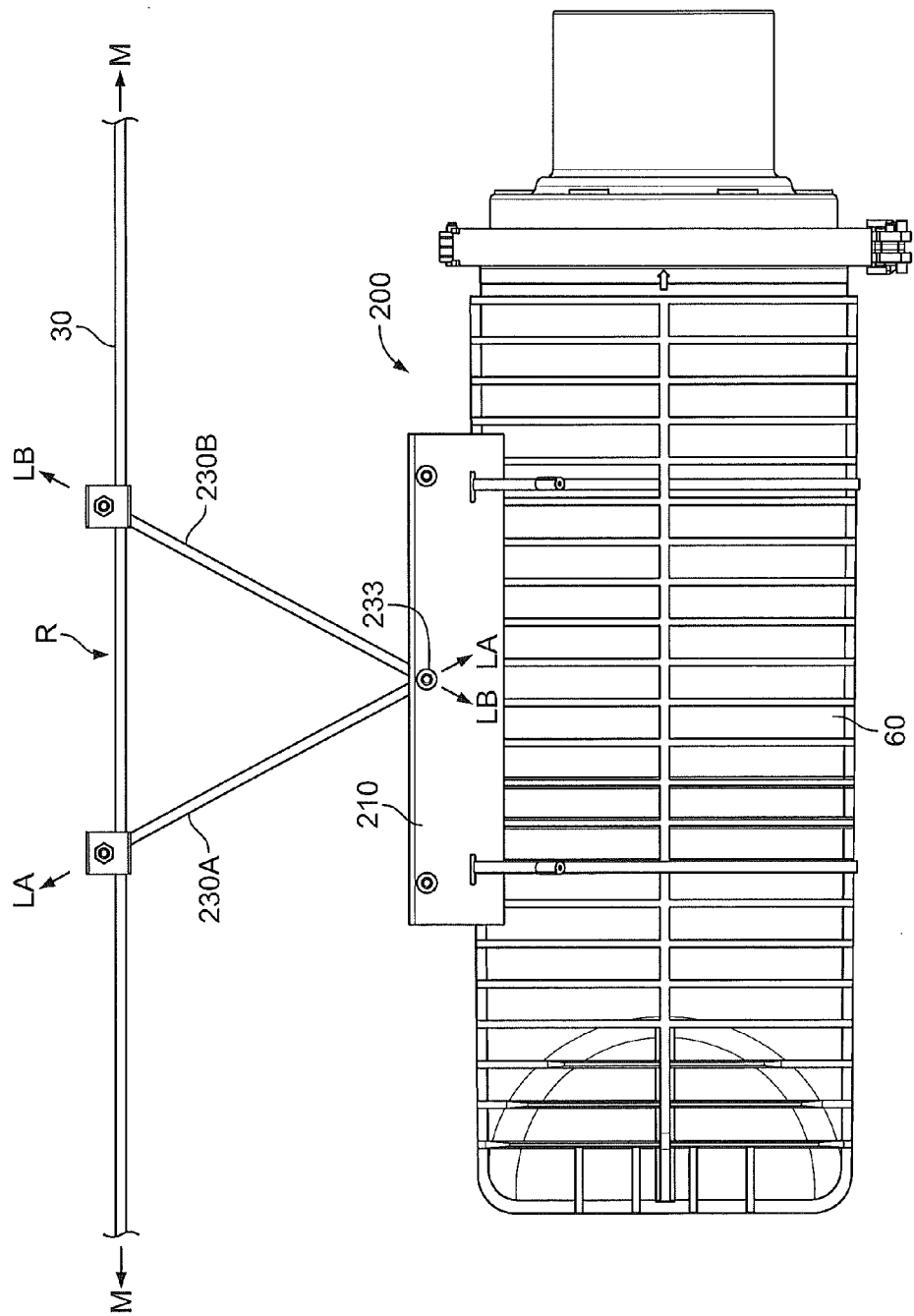
FIG. 11 is a fragmentary, side view of a telecommunications cabling management system according to further embodiments of the present invention with a cable bundle and lashing wire thereof omitted for the purpose of explanation.

According to further embodiments, and as shown in FIG. 11, a hanger assembly 200 may be provided that generally corresponds to the hanger assembly 100 except that the lower ends 233 of the arms 230A, 230B are pivotally coupled to the base 210 at the same location. When the hanger assembly 200 is installed on the strand 30, the lengthwise axes LA-LA, LB-LB of the arms 230A, 230B and the strand axis M-M define a triangle R.

According to further embodiments and as shown in FIG. 12, a hanger assembly 300 may be provided that generally corresponds to the hanger assembly 100 except that the arms 330A, 330B are pivotally coupled to the base 310 and configured to cross over one another as shown. When the hanger assembly 300 is installed on the strand 30, the arms 330A, 330B define an "X".

According to some embodiments, the arms of the hanger assembly 100 or the hanger assembly 300 may be arranged in a triangular configuration with the pivot point axis Q-Q forming the triangle base and the upper ends of the arms converging to a vertice at the strand 30.

Figure 13:
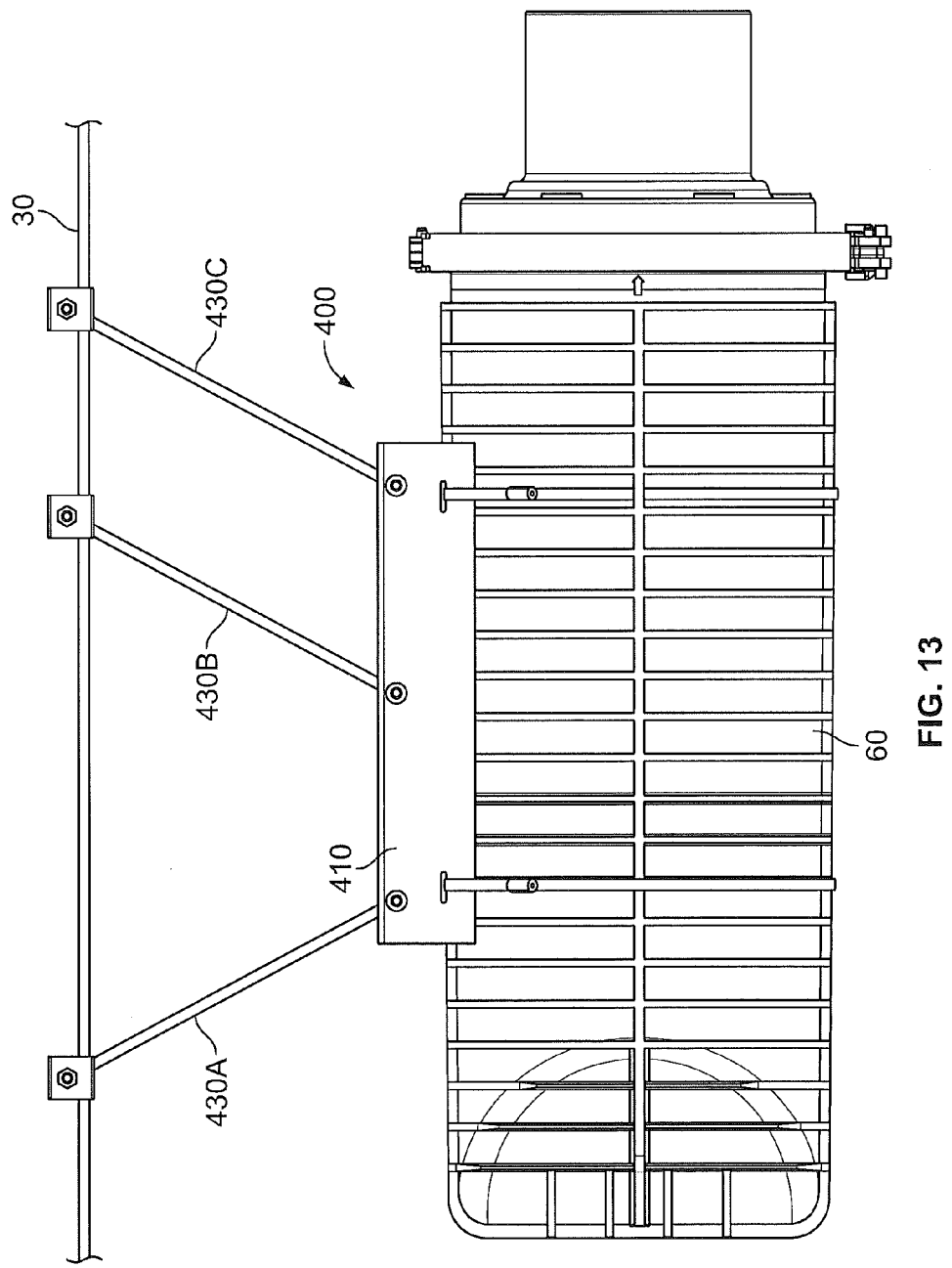
FIG. 13 is a fragmentary, side view of a telecommunications cabling management system according to further embodiments of the present invention with a cable bundle and lashing wire thereof omitted for the purpose of explanation.

Hanger assemblies according to further embodiments of the invention may have three or more arms pivotally coupled to a base at their lower ends and which can be clamped or otherwise secured to the strand 30. For example, a hanger assembly 400 as shown in FIG. 13 generally corresponds to the hanger assembly 100 except that the hanger assembly 400 has three arms 430A, 430B, 430C pivotally coupled at their lower ends to the base 410 and clamped to the strand 30 at their upper ends.

According to some embodiments, a crossbrace having an adjustable length such as the crossbrace 164 may be used in place of the fixed length crossbrace 160 in any of the mounting configurations of the hanger assemblies 100, and vice-versa. Other alternatives for the crossbrace may include a metal cable or a rigid bar.

Figure 14:
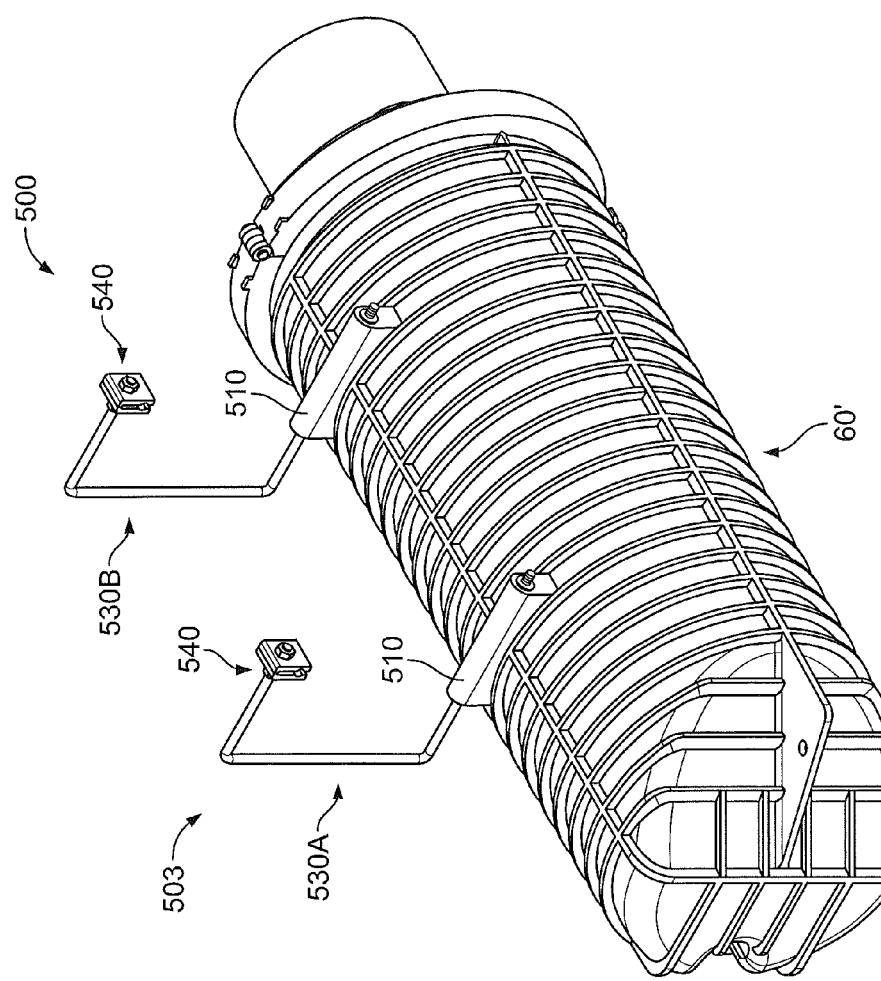
FIG. 14 is a top perspective view of a unitary hanger/enclosure assembly according to further embodiments of the present invention.

With reference to FIG. 14, a unitary hanger/enclosure assembly 503 including a hanger assembly 500 according to further embodiments of the present invention is shown therein. The hanger/enclosure assembly 503 corresponds to and may be used in the same manner as the hanger/enclosure assembly 103 except that the hanger assembly 500 includes a base, coupling or anchor portion or portions 510 integral with the enclosure 60' in place of the separate, attachable base 110. Arms 530A, 530B and coupling devices 540 corresponding to components 130A, 130B and 140, respectively, are joined to the anchor portions 510 in the same manner as described with respect to the base 110. A single anchor portion 510 may be provided for both arms 530A, 530B. According to some embodiments, the anchor portions 510 are unitarily formed with and monolithic with the enclosure 60'. In some embodiments, the anchor portions 510 are unitarily molded with the enclosure 60'.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A hanger assembly for mounting a cable splice enclosure on an elongate support including a strand, the hanger assembly comprising:
    a body having a top wall, and two, opposite, side walls, each of the two side walls defining coupling slots therein;
    clamps positioned within the coupling slots to secure the body to a portion of the enclosure, wherein the enclosure includes a housing moveable between an open configuration where an interior of the housing can be accessed and a closed configuration where the interior of the housing is enclosed;
    first and second arms each having opposed upper and lower ends, the lower ends each being pivotally secured to the sides of the body at first and second pivotal connection points, the first and second pivotal connection points providing a pivotal relationship between the first and second arms and the enclosure, respectively, that allows pivotal movement between the enclosure and the first and second arms;
    first and second attachment devices on the upper ends of the first and second arms, respectively, and being configured to secure the first and second arms, respectively, to the strand, the first and second attachment devices are engaged to the strand and slide thereon as the first and second arms pivot about the lower ends, respectively, to allow the enclosure to be moved between a first adjacent position and a second offset position;
    wherein in the first adjacent position the first and second pivotal connection points are closer to the strand and in the second offset position the first and second pivotal connection points are farther from the strand, wherein the enclosure is moveable between the first adjacent position and the second offset position while the housing remains in the closed configuration; and
    wherein each of the first and second arms includes an intermediate section extending vertically between the lower end and the upper end, and an upper section extending laterally between the intermediate section and the associated one of the first and second attachment devices, whereby the body and the first and second arms define a cable passage between the first and second attachment devices and the body to receive a cable or cables with a cable splice enclosed within the enclosure.

2. The hanger assembly of claim 1 wherein the first and second pivotal connection points are spaced apart along a length of the body.

3. The hanger assembly of claim 2 wherein each of the first and second arms is rigid from its lower end to its upper end.

4. The hanger assembly of claim 3 wherein:
    the first arm defines a first arm axis;
    the second arm defines a second arm axis;
    the first and second pivot axes define a pivot point axis extending through each of the first and second pivot axes; and
    when the hanger assembly is secured to the strand, the first and second arm axes, and the pivot point axis collectively define a trapezoid wherein the support axis and the pivot point axis are substantially parallel and the first and second arm axes are nonparallel.

5. The hanger assembly of claim 3 wherein:
    the first arm defines a first arm axis;
    the second arm defines a second arm axis;
    the first and second pivot axes define a pivot point axis extending through each of the first and second pivot axes; and
    when the hanger assembly is secured to the strand, the first and second arm axes, and the pivot point axis collectively define a parallelogram wherein the support axis and the pivot point axis are substantially parallel and the first and second arm axes are substantially parallel.

6. The hanger assembly of claim 3 wherein the first and second arms cross one another.

7. The hanger assembly of claim 1 including a crossbrace mounted on the first and second arms to maintain the first and second arms in a selected configuration.

8. The hanger assembly of claim 1 wherein the lower ends of the first and second arms are pivotable about the same pivot axis.

9. The hanger assembly of claim 1 including:
    a third arm having opposed upper and lower ends, the lower end being pivotally secured to the body; and
    a third attachment device on the upper end of the third arm configured to secure the third arm to the strand.

10. The hanger assembly of claim 1 wherein the first and second attachment devices are cable clamps.

11. The hanger assembly of claim 1, wherein an orientation of the enclosure remains the same relative to the strand while the enclosure is moved between the first adjacent position and the second offset position.

12. A mounted enclosure assembly comprising:
    an elongate support including a strand;
    a cable splice enclosure;

a hanger assembly including:
a body having a top wall, and two, opposite, side walls, each of the two side walls defining coupling slots therein;
clamps positioned within the coupling slots to secure the body to a portion of the enclosure, wherein the enclosure includes a housing moveable between an open configuration where an interior of the housing can be accessed and a closed configuration where the interior of the housing is enclosed;
first and second arms each having opposed upper and lower ends, the lower ends each being pivotally secured to the side walls of the body at first and second pivotal connection points, the first and second pivotal connection points providing a pivotal relationship between the first and second arms and the enclosure, respectively, that allows pivotal movement between the enclosure and the first and second arms;
first and second attachment devices on the upper ends of the first and second arms, respectively, and securing the first and second arms, respectively, to the strand, the first and second attachment devices are engaged to the strand and slide thereon as the first and second arms pivot about the lower ends, respectively, to allow the enclosure to be moved between a first adjacent position and a second offset position;
wherein in the first adjacent position the first and second pivotal connection points are closer to the strand and in the second offset position the first and second pivotal connection points are farther from the strand, wherein the enclosure is moveable between the first adjacent position and the second offset position while the housing remains in the closed configuration; and
wherein each of the first and second arms includes an intermediate section extending vertically between the lower end and the upper end, and an upper section extending laterally between the intermediate section and the associated one of the first and second attachment devices, whereby the body and the first and second arms define a cable passage between the first and second attachment devices and the body to receive a cable or cables; and
a bundle of cables extending between the strand and the body through the cable passage;
wherein a cable splice is enclosed within the enclosure.

13. The mounted enclosure assembly of claim 12 wherein each of the first and second arms is rigid from its lower end to its upper end.

14. The mounted enclosure assembly of claim 12 wherein:
the strand is suspended from a plurality of support structures; and
the bundle of cables is lashed to the strand.

15. The mounted enclosure assembly of claim 13 wherein:
the lower ends of the first and second arms are pivotable about first and second pivot axes, respectively, at their lower ends;
the first and second pivot axes are spaced apart along a length of the body;
the strand defines a support axis;
the first arm defines a first arm axis;
the second arm defines a second arm axis;
the first and second pivot axes define a pivot point axis extending through each of the first and second pivot axes; and
the support axis, the first and second arm axes, and the pivot point axis collectively define a trapezoid wherein the support axis and the pivot point axis are substantially parallel and the first and second arm axes are nonparallel.

16. The mounted enclosure assembly of claim 13 wherein:
the lower ends of the first and second arms are pivotable about first and second pivot axes, respectively, at their lower ends;
the first and second pivot axes are spaced apart along a length of the body;
the strand defines a support axis;
the first arm defines a first arm axis;
the second arm defines a second arm axis;
the first and second pivot axes define a pivot point axis extending through each of the first and second pivot axes; and
the support axis, the first and second arm axes, and the pivot point axis collectively define a parallelogram wherein the support axis and the pivot point axis are substantially parallel and the first and second arm axes are substantially parallel.

17. The mounted enclosure assembly of claim 12, wherein an orientation of the enclosure remains the same relative to the strand while the enclosure is moved between the first adjacent position and the second offset position.

18. A hanger assembly for mounting an enclosure on an elongate support including a strand, the hanger assembly comprising:
a body having a top wall, and two, opposite, side walls, each of the two side walls defining coupling slots therein;
clamps positioned within the coupling slots to secure the body to a portion of the enclosure, wherein the enclosure includes a housing moveable between an open configuration where an interior of the housing can be accessed and a closed configuration where the interior of the housing is enclosed;
first and second arms each having opposed upper and lower ends, the lower ends each being pivotally secured to the side walls of the body at first and second pivotal connection points, the first and second pivotal connection points providing a pivotal relationship between the first and second arms and the enclosure, respectively, that allows pivotal movement between the enclosure and the first and second arms; and
first and second attachment devices on the upper ends of the first and second arms, respectively, and being configured to secure the first and second arms, respectively, to the strand, the first and second attachment devices are engaged to the strand to permit the first and second attachment devices to slide thereon;
wherein the first and second arms pivot about their lower ends while the first and second attachment devices slide along the strand to allow the enclosure to be moved between a first adjacent position where the first and second pivotal connection points are closer to the strand and a second offset position where the first and second pivotal connection points are farther from the strand, wherein the enclosure is moveable between the first adjacent position and the second offset position while the housing remains in the closed configuration; and
wherein each of the first and second arms is rigid from its lower end to its upper end.

19. The hanger assembly of claim 18 wherein the first and second arms are pivotable about first and second pivot axes, respectively, at their lower ends, and the first and second pivot axes are spaced apart along a length of the body; and
wherein:

the strand defines a support axis;
the first arm defines a first arm axis;
the second arm defines a second arm axis;
the first and second pivot axes define a pivot point axis extending through each of the first and second pivot axes; and
when the hanger assembly is secured to the strand, the support axis, the first and second arm axes, and the pivot point axis collectively define a trapezoid wherein the support axis and the pivot point axis are substantially parallel and the first and second arm axes are nonparallel.

20. The hanger assembly of claim 18 wherein the first and second attachment devices are first and second cable clamps each including a pair of opposed clamp plates and a nut mounted on an end of the associated arm.

21. The hanger assembly of claim 20 wherein:
the strand defines a support axis;
each of the first and second cable clamps is pivotable about the end of its associated arm about a respective pivot axis transverse to the support axis.

22. The hanger assembly of claim 18, wherein an orientation of the enclosure remains the same relative to the strand while the enclosure is moved between the first adjacent position and the second offset position.

23. Telecommunications cable distribution arrangement comprising: a strand; a fiber optic cable lashed to the strand; an enclosure for receiving at least one optical fiber from the fiber optic cable, the enclosure including a housing moveable between an open configuration where an interior of the housing can be accessed and a closed configuration where the interior of the housing is enclosed; and a hanger for securing the enclosure to the strand, the hanger including a pivotal linkage pivotable about a pivotal connection point, the pivotal connection providing a pivotal relationship between the pivotal linkage and the enclosure that allows pivotal movement between the enclosure and the pivotal linkage, the pivotal linkage allowing the enclosure to be moved between a first adjacent position where the pivotal connection point is closer to the strand and a second offset position where the pivotal connection point is farther from the strand, wherein the enclosure is moveable between the first adjacent position and the second offset position while the housing remains in the closed configured; and wherein the fiber optic cable is part of a bundle of fiber optic cables, and wherein at least a portion of the bundle extends outside and above the enclosure when the enclosure is in the dosed configuration.

24. The telecommunications cable distribution arrangement of claim 23, further comprising an attachment device positioned on the upper end of the pivotal linkage to secure the pivotal linkage to the strand, wherein the pivotal linkage pivots about the lower end to allow the attachment device to slide along the strand as the enclosure is moved between the first adjacent position and the second offset position.

25. The telecommunications cable distribution arrangement of claim 23, wherein the enclosure translates between the first adjacent position and the second offset position without rotation relative to the strand.

26. The telecommunications cable distribution arrangement of claim 23, wherein an orientation of the enclosure remains the same relative to the strand while the enclosure is moved between the first adjacent position and the second offset position.

* * * * *